(12) United States Patent
Pignault

(10) Patent No.: US 6,493,393 B1
(45) Date of Patent: Dec. 10, 2002

(54) DIGITAL COMMUNICATION BUS FOR CONNECTING ELECTRONIC MODULES

(75) Inventor: Bernard Pignault, Mouans Sartoux (FR)

(73) Assignee: Schneider Automation, Valbonne (FR)

( * ) Notice: Subject to any disclaimer, the term of this patent is extended or adjusted under 35 U.S.C. 154(b) by 0 days.

(21) Appl. No.: 09/044,926

(22) Filed: Mar. 20, 1998

(30) Foreign Application Priority Data

Mar. 20, 1997 (FR) .............................. 97 03522

(51) Int. Cl.$^7$ .............................. H04B 3/00; H04L 25/00
(52) U.S. Cl. .......................... 375/257; 333/21 A; 326/30
(58) Field of Search .............................. 375/257, 260, 375/377, 220; 370/285, 286, 289; 379/26, 27, 414, 2, 26.01; 333/124, 32, 1, 21 A, 21 R; 326/30; 324/523

(56) References Cited

U.S. PATENT DOCUMENTS

| | | | |
|---|---|---|---|
| 4,710,949 A | * 12/1987 | Ahuja | 379/26 |
| 4,991,196 A | * 2/1991 | Krebs | 379/27 |
| 5,430,396 A | 7/1995 | Morano | 326/90 |
| 5,483,573 A | * 1/1996 | Steenton et al. | 379/2 |
| 5,708,364 A | * 1/1998 | Vokey et al. | 324/523 |

FOREIGN PATENT DOCUMENTS

| | | |
|---|---|---|
| EP | 0195 595 | 9/1986 |
| EP | 0727 729 | 8/1996 |

OTHER PUBLICATIONS

Patent Abstracts of Japan, vol. 14, No. 414 (E–0975), Sep. 7, 1990, JP 2 159849, Jun. 20, 1990.

* cited by examiner

*Primary Examiner*—Jean Corrielus
(74) *Attorney, Agent, or Firm*—Oblon, Spivak, McClelland, Maier & Neustadt, P.C.

(57) ABSTRACT

This invention relates to a digital communication bus between electronic modules (S1, Sn), composed of at least one pair of data transmission lines (2A, 2B) and terminating by line terminators (TA, TB), and characterized by the fact that it comprises, for example in the two line terminators (TA, TB), components (R6, R7, R3, R4) imposing transmission with polarization and inverting the polarization whenever one or both line terminators are missing, or are not connected to the bus, or the bus is open.

5 Claims, 3 Drawing Sheets

DIGITAL COMMUNICATION BUS FOR CONNECTING ELECTRONIC MODULES

BACKGROUND OF THE INVENTION

1. Field of the Invention

This invention relates to a digital communication bus for connecting electronic modules.

2. Discussion of the Background

Automation functions (racks, modules and various couplers) can be placed in different locations if a bus B is used to connect the various automation stations such as S1, S2, Sn, as shown in FIG. 1. This bus consists of transmission pairs and is terminated at both ends by identical line terminators TA and TB. This layout makes it impossible to detect a bus continuity fault.

Patent EP 0 517 609 describes a serial bus capable of connecting this type of automation module.

SUMMARY OF THE INVENTION

The purpose of this invention is to provide a bus capable of detecting a bus continuity fault, for example a connection fault in one of the two line terminators. If there is no fault, the line used for this detection can be used for digital communications.

The bus according to the invention is composed of at least one pair of data transmission lines and terminates with line terminators and is characterized essentially by the fact that it comprises components, for example in the two line terminators, imposing transmission with polarization and inverting the polarization whenever at least one of the line terminators is missing, or is not connected to the bus, or the bus is open.

According to one characteristic, the bus comprises two resistances in each module, associated with a transmission pair and capable of polarizing this pair, one of these resistances being connected to a first line in the said pair, the other resistance being connected to the second line.

According to another characteristic, the bus comprises a dividing bridge at each end, the mid-point of this bridge being connected to one line, and the second line being connected to a resistance at the first line terminator end, the first line being connected to a resistance at the second line terminator end, the bridges being inverted at one end compared with the other.

According to another characteristic, at each end the bus includes a doubly dividing bridge with three resistances, the first line being connected at the first line terminator end to a capacitor connected to one of the two mid-points of the bridge, the second line being connected at the second line terminator end to a capacitor connected to one of the two mid-points of the bridge.

BRIEF DESCRIPTION OF THE DRAWINGS

We will now describe the invention in more detail with reference to embodiments given as examples and shown on the attached drawings in which.

DESCRIPTION OF THE PREFERRED EMBODIMENTS

Figure 1:
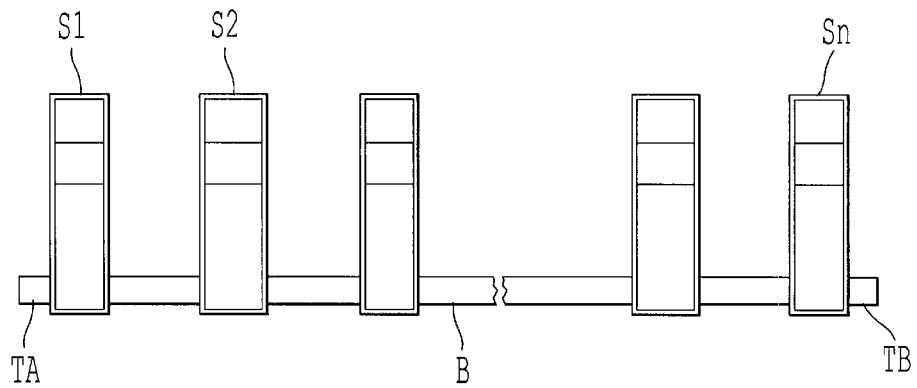
FIG. 1 is a diagram showing the architecture composed of electronic modules connected through a bus according to the invention.

FIG. 1 shows several electronic modules S1, S2, . . . Sn, designed to exchange digital data in real time, for example variables and/or digital messages, through a serial type bus B. These modules may be couplers or programmable logic controller racks or PC type stations.

Bus B consists of several transmission pairs, of which one pair 3A–3B outputs a DC voltage (+5 V). One pair 2A–2B arbitrates in accordance with patent EP 517 609 mentioned above. This pair is in accordance with the RS 485 standard.

The bus pairs are embedded between modules such as S1 and S2 in a cable 4. Inside each module such as S1, S2, . . . , the pairs end in two connectors CA–CB for this module. These connectors are used to connect the interconnection cables 4 between the modules or line terminators described below.

The two ends of the network terminate in line terminators TA and TB that are fitted on the two connectors CB of the two network end modules S1 and Sn.

Figure 2:
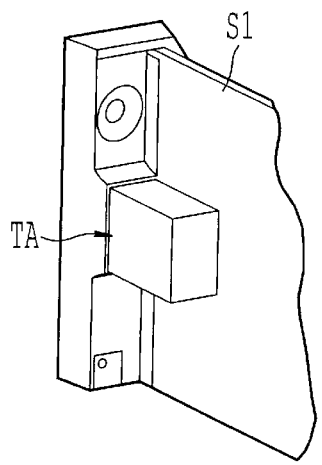
FIG. 2 is a diagram of the bus line terminator according to the invention.

The line terminator TA (FIG. 2) is composed of a box fitted with a connector and containing a card with electronic components.

A voltage polarization is necessary on line 2A–2B. It gives one of the two logical states of the differential pair (1) whereas the other state (0) is imposed by one or several module transmitters.

Figure 3:
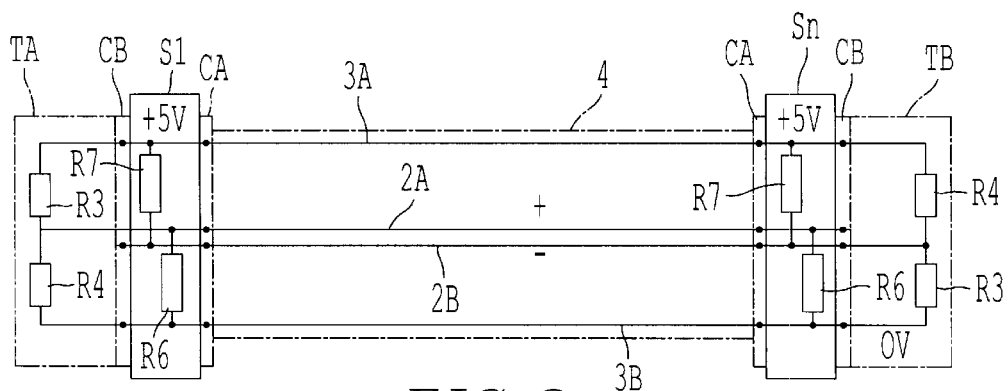
FIG. 3 is a diagram of the first embodiment of the bus according to the invention.
Figure 4:
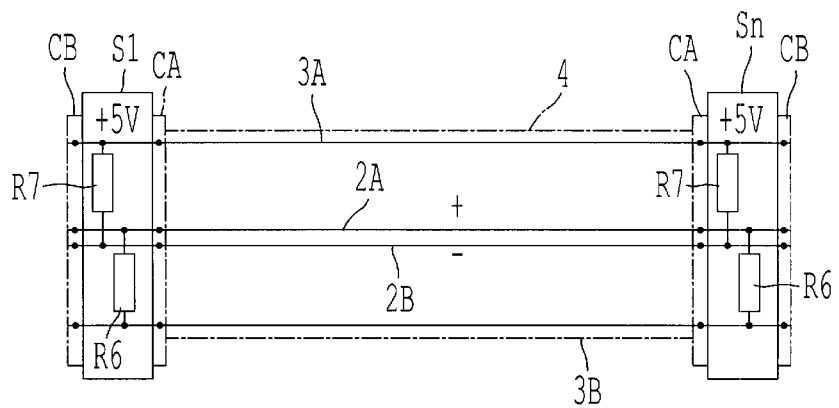
FIG. 4 is a diagram showing the bus in FIG. 3 in which two line terminators are missing.

In the embodiment shown in FIGS. 3 and 4, each module comprises a resistance R6 installed between line 2A and the 0V (line 3B), and a resistance R7 mounted between the 5V (line 3A) and line 2B. These resistances are high (for example 20 KΩ and 22 kΩ). Each line terminator has a dividing bridge R3–R4 connected to the terminals of the power supply pair 3A–3B. The mid-point of bridge R3–R4 in terminator TA is connected to the first line 2A. The mid-point of bridge R4–R3 in terminator TB is connected to the second line 2B.

A missing connection or a connection fault in at least one of the two line terminators TA and TB is detected by means of the two resistances R6 and R7.

Figure 5:
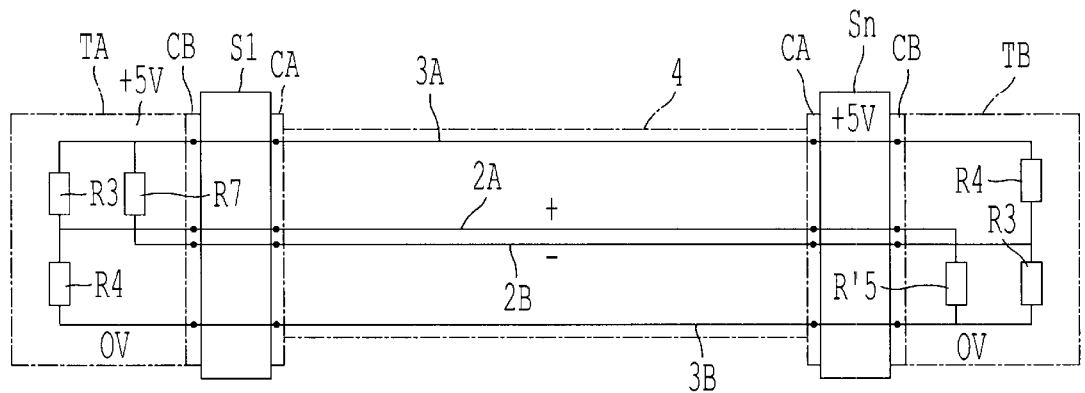
FIG. 5 is a diagram of a second embodiment of the bus according to the invention.
Figure 6:
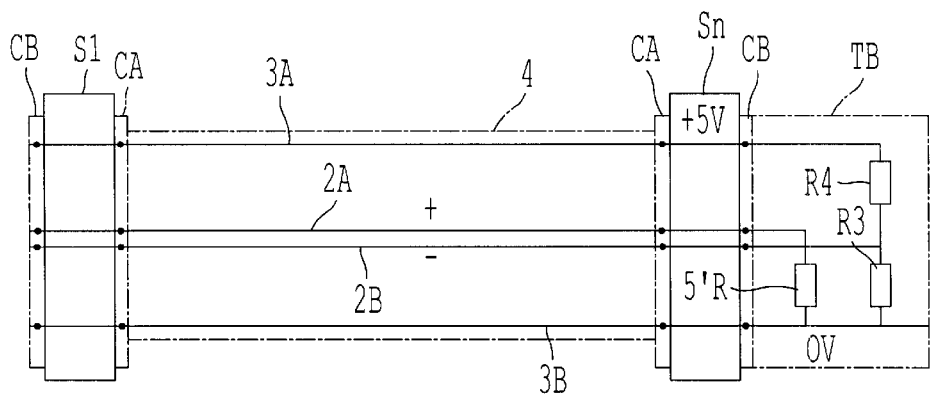
FIG. 6 is a diagram of the bus in FIG. 5, in which the line terminator TA is missing.
Figure 7:
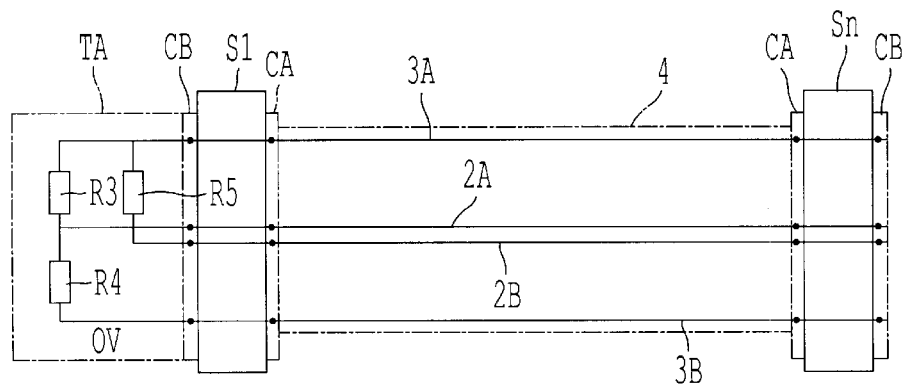
FIG. 7 is a diagram of the bus in FIG. 5 in which the line terminator TB is missing.

In the embodiment shown in FIGS. 5 to 7, each line terminator has a dividing bridge R3–R4 connected to the terminals of the power supply pair 3A–3B. The mid-point of bridge R3–R4 in terminator TA is connected to the first line 2A. The mid-point of bridge R4–R3 in terminator TB is connected to the second line 2B. Terminator TA comprises a resistance R5 connected to the second line 2B and to the power supply line 3A (+5 V). Terminator TB comprises a resistance R5 connected to the first line 2A and the power supply line 3B (0 V).

As a guide, the values of the resistances could be 150 Ω for R3, and 350 Ω Ohm for R4. Resistances R5 and R5' are high (for example between 2.5 and 3 kΩ).

Line terminators TA and TB are both connected to the bus, to polarize the pair 2A–2B. If only one of the two line terminators is connected, the inverse polarization is applied to this pair and the fault is then detected by the modules.

Figure 8:
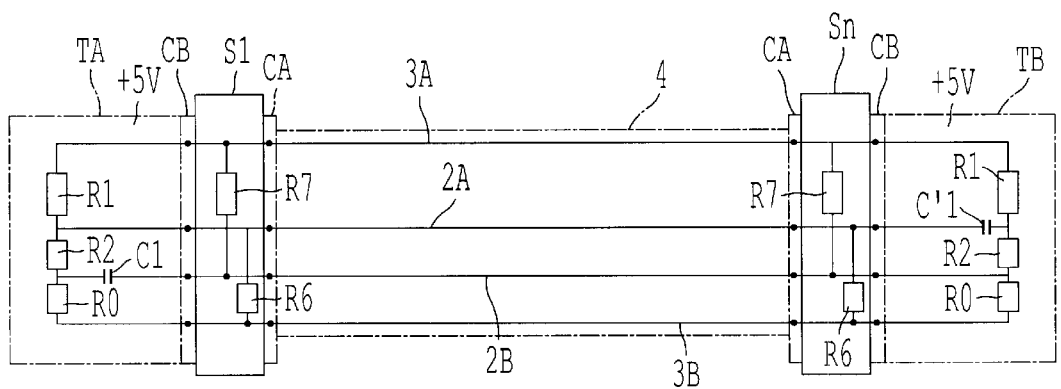
FIG. 8 is an embodiment of the bus providing impedance matching for high frequencies.

In the embodiment shown in FIG. 8, each line terminator TA or TB comprises a doubly dividing bridge with three resistances R1, R2, R0. The second line 2B is connected in the line terminator TA to a capacitor C1 connected to the mid-point of the bridge resistances R0–R2, and in the line terminator TB to the mid-point of resistance R2–R0. The first line 2A is connected in the line terminator TA to the mid-point of resistance R1–R2, and in line terminator TB to a capacitor C'1 connected to the mid-point of the bridge resistance R1–R2.

The circuit gives the polarization voltage of pair 2A–2B (starting from a DC voltage of +5 V) and provides a differential impedance close to the value (120 Ω) necessary to match the pair (which has a characteristic impedance equal to this nominal value).

We will now describe the operation of the bus.

Firstly refer to FIGS. 3, 5 and 8, in which the two line terminators TA and TB are in position.

If the power supply voltage is 5 V, the voltage on line 2A is close to 3.5 V and the voltage on line 2B is close to 1.5 V. Therefore, the voltage difference is close to +2 V. The logical state is 1 and arbitration operates normally.

When line terminator TB only is connected (FIG. 6), the voltage on line 2A is 0V and the voltage on line 2B is 1.5 V. Therefore, the voltage difference is −1.5 V. The logical state is 0 and the modules detect the fault. Operation of arbitration may then be blocked.

When line terminator TA only is connected (FIG. 7), the voltage on line 2A is close to 3.5 V whereas the voltage on line 2B is close to −5 V. Therefore the voltage difference is close to −1.5 V. The logical state is 0 and the modules detect the fault. Operation of arbitration may then be blocked.

At low impedance, the circuit only polarizes one of the two conductors in each line terminator, whereas the impedance of the second conductor is increased towards one of the two power supply voltages. This increase becomes insignificant as soon as bus continuity is established and the low impedance of the second line terminator is imposed remotely.

When neither of the line terminators TA or TB is connected (FIG. 4), the voltage on line 2A is 0 V and the voltage on line 2B is 5 V. Therefore, the voltage difference is −5 V. The logical state is 0 and the modules detect the fault. Operation or arbitration may then be blocked.

In the embodiment shown in FIG. 8, impedance matching is done for high frequencies. This solution is suitable for long buses and fast fronts. The solution shown in FIGS. 5 to 7 is more suitable for short buses which are not too fast.

Obviously, without going outside the scope of the invention, it would be possible to imagine alternatives and improvements to detail, and even consider the use of equivalent means.

Thus line A could be replaced by a power supply specific to each module.

What is claimed is:

1. A digital communication bus having at least one pair of data transmission lines being terminated at each of two opposite ends by a respective one of two line terminators, said digital communication bus including said at least one pair of data transmission lines being connected to electronic modules including end electronic modules which are the electronic modules connected nearest to the two line terminators, wherein the two line terminators include at least some of a number of polarizing components configured to impose a polarization condition relative to the at least one pair of transmission lines and to invert the polarization condition whenever one or both of the two line terminators are missing, or are not properly connected to the digital communication bus including the at least pair of data transmission lines, or the digital communication bus including the at least one pair of data transmission lines is open.

2. The digital communication bus according to claim 1, wherein each end electronic module includes two resistance components associated with the at least one pair of data transmission lines, said two resistance components being configured to contribute to the polarization condition, with one of these resistance components being connected to a first line of the at least one pair of data transmission lines, the other resistance components being connected to the second line of the at least one pair of data transmission lines.

3. The digital communication bus according to any one of claims 1 or 2, wherein the polarizing components included with each of the two line terminators further include a dividing bridge, with each dividing bridge have a mid-point connected to a different one of the at least one pair of data transmission lines.

4. The digital communication bus according to any one of claims 1 or 2 wherein the polarizing components included with each of the two line terminators further include a doubly dividing bridge with three resistance components, with a different one of the at least one pair of data transmission lines at each of the line terminators being connected to a capacitor that is in turn connected to a different one of two mid-points formed between the three resistance components at each of the two line terminators.

5. The digital communication bus according to claim 3, wherein the polarizing components each include a further resistance component with each said further resistance component being connected to a different one of the at least one pair of data transmission lines at each of the two line terminators.

* * * * *